June 20, 1950  R. E. HERRSTRUM  2,512,019
HYDRAULIC MACHINE TOOL

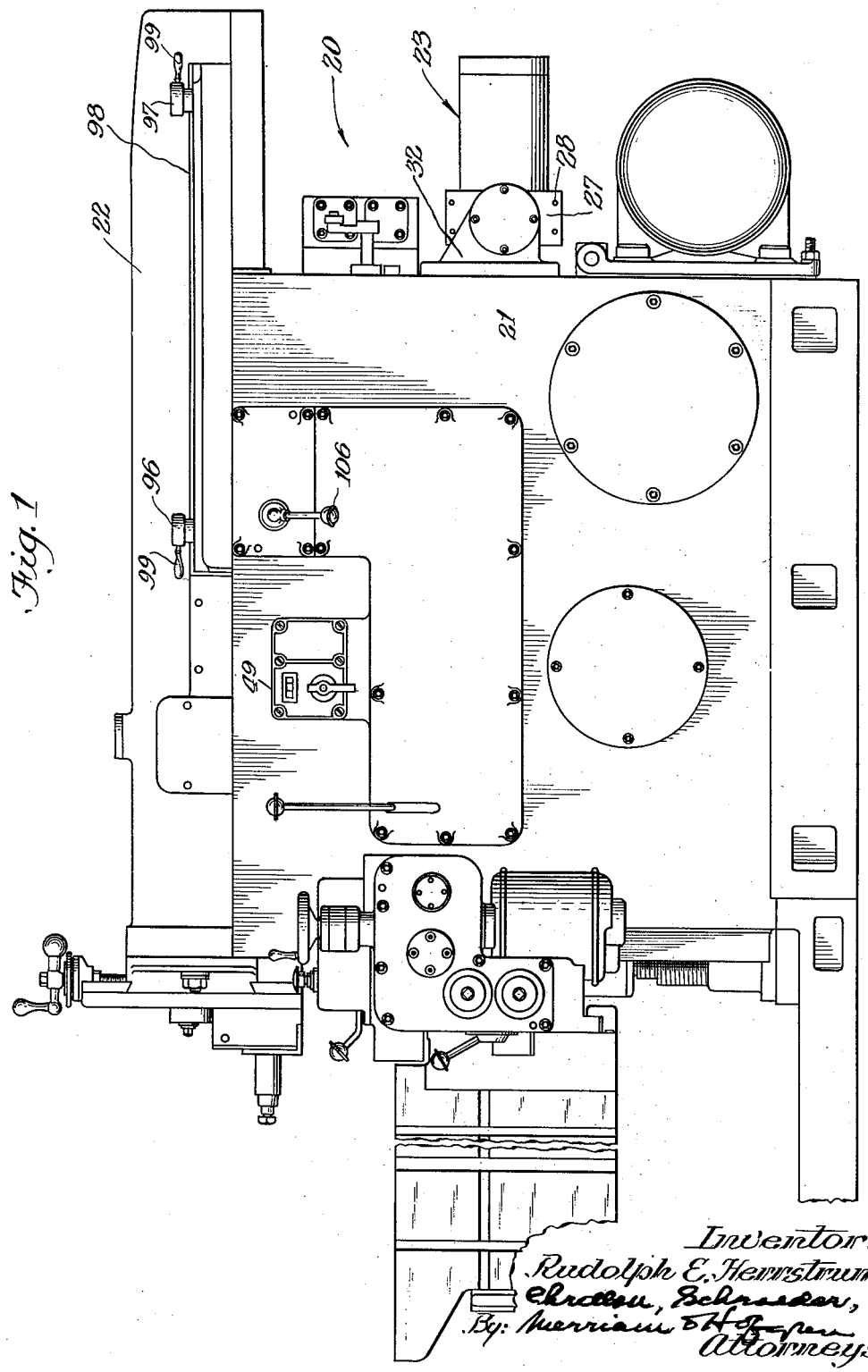

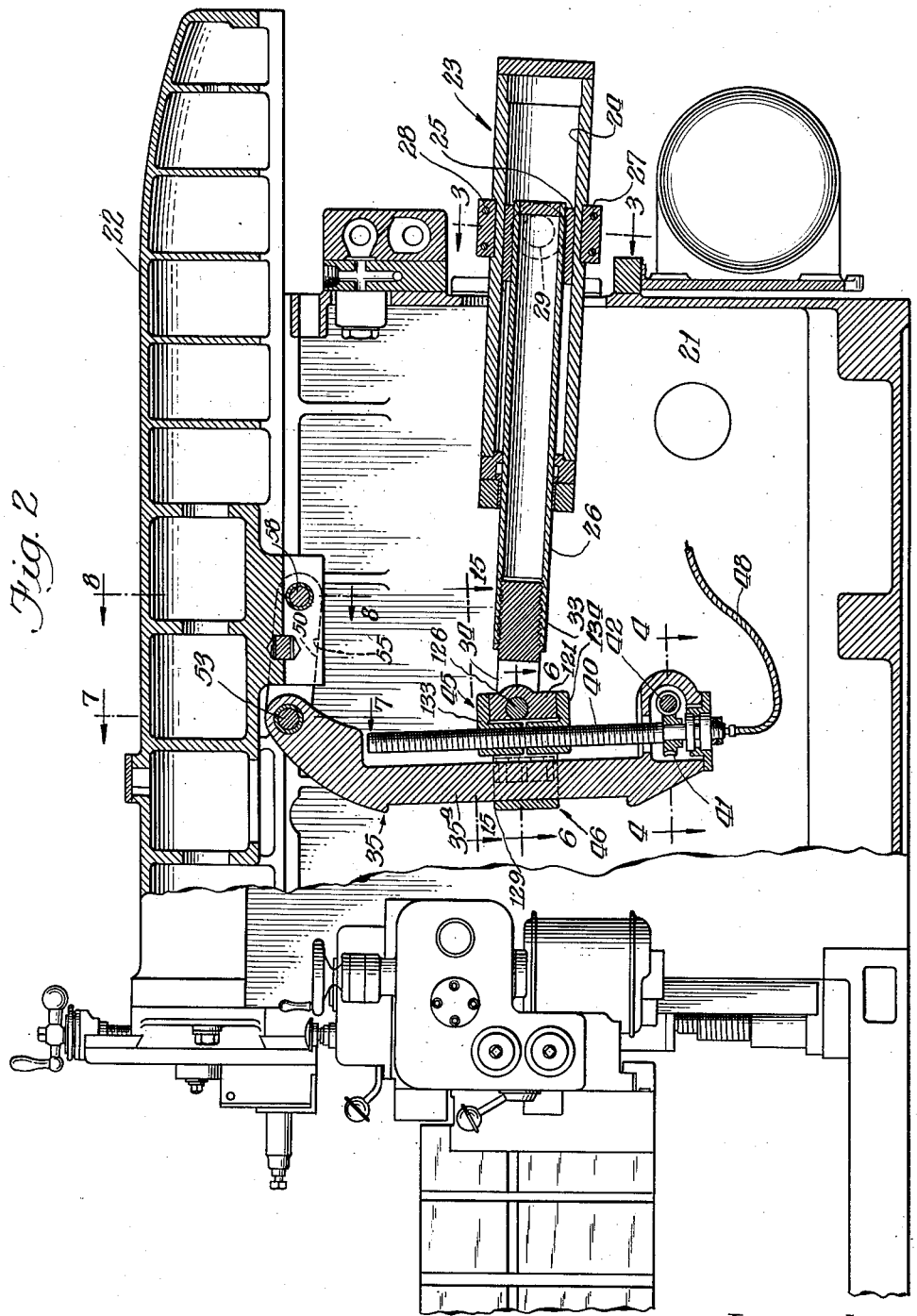

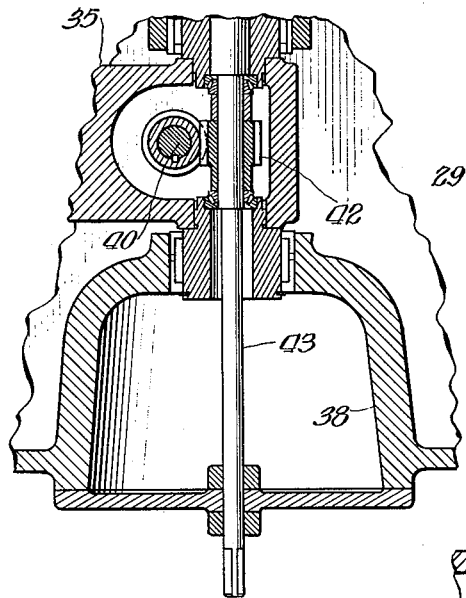
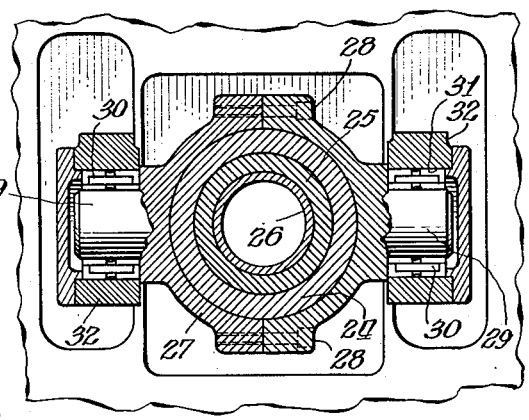
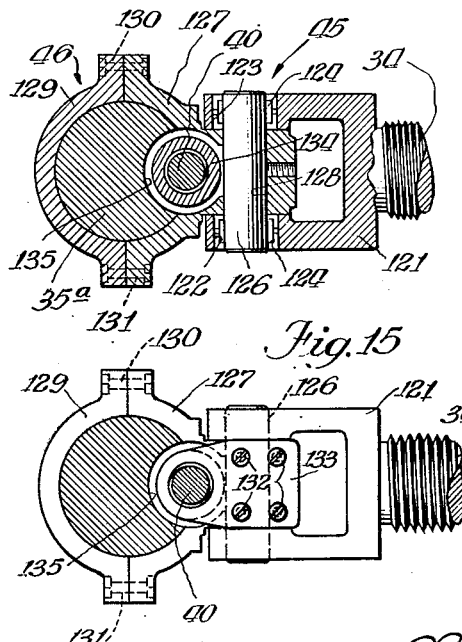
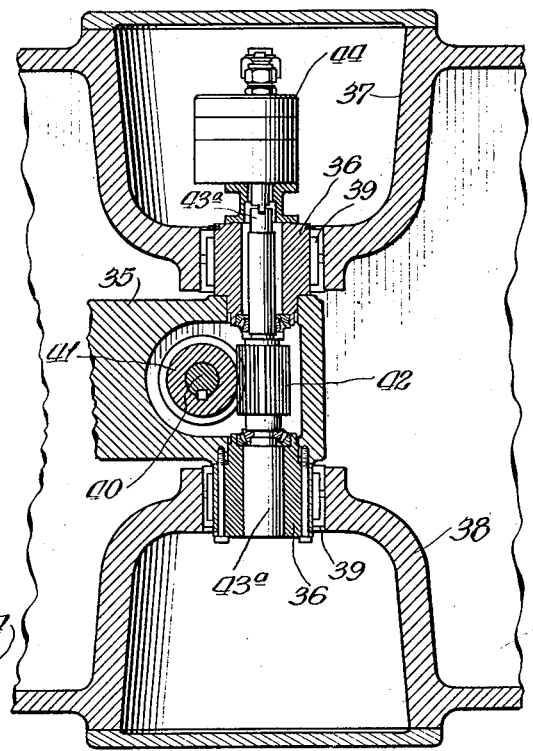

Filed May 15, 1947  7 Sheets-Sheet 4

Inventor:
Rudolph E. Herrstrum
By: Christon, Schroeder, Merriam Hofgren
Attorneys.

June 20, 1950  R. E. HERRSTRUM  2,512,019
HYDRAULIC MACHINE TOOL

Filed May 15, 1947  7 Sheets-Sheet 5

Inventor:
Rudolph E. Herrstrum
By Chritton, Schroeder, Merriam & Hofgren
Attorneys.

June 20, 1950 — R. E. HERRSTRUM — 2,512,019
HYDRAULIC MACHINE TOOL
Filed May 15, 1947 — 7 Sheets-Sheet 6

Inventor:
Rudolph E. Herrstrum
By: Chritton, Schroeder, Merriam & Hofgren
Attorneys Inventor:
Rudolph E. Herrstrum
By: Chritton, Schroeder, Merriam & Hofgren
Attorneys.

Patented June 20, 1950

2,512,019

UNITED STATES PATENT OFFICE 2,512,019

HYDRAULIC MACHINE TOOL

Rudolph E. Herrstrum, Rockford, Ill., assignor to Rockford Machine Tool Company, Rockford, Ill., a corporation of Illinois Application May 15, 1947, Serial No. 748,252

13 Claims. (Cl. 90—39)

This invention relates to machine tools, and more particularly to machine tools of the shaper or planer type.

It is a general object of this invention to produce a machine tool of the class described having increased efficiency and versatility.

A further object of the invention is to produce a shaper having a constant power input with selectively variable forces and cutting speeds available at the ram.

It is a further object of the invention to produce a hydraulic machine tool of the class described which permits the employment of a constant displacement pump and yet is adapted to transmit variable force to the ram.

Another object of the invention is to produce a hydraulic shaper in which the ram speeds are selectable over a wide range.

A further object of the invention is to produce a hydraulic shaper in which the force applied to the ram is variable over a wide range with substantially constant power input.

A further object of the invention is to produce a hydraulic shaper in which full power is used at all ram speeds.

A further object of the invention is to produce a hydraulic shaper as described in the preceding paragraphs in which the stroke of the reciprocating member and the speed thereof are variable with a constant power input.

A further object of the invention is to produce a simple and efficient hydraulic circuit for use with such a hydraulic shaper.

Other and further objects of the invention will become apparent from the following description and drawings in which:

Fig. 1 is a side elevation of a hydraulic shaper embodied in the invention;

Fig. 2 is a side elevation, partly broken away for clarity of illustration and showing the important moving parts of the shaper;

Figs. 3, 4, 6 and 15 are sectional views along lines 3—3, 4—4, 6—6 and 15—15 of Fig. 2, respectively;

Fig. 5 is a view like Fig. 4 of a modified form of construction.

Figure 7:
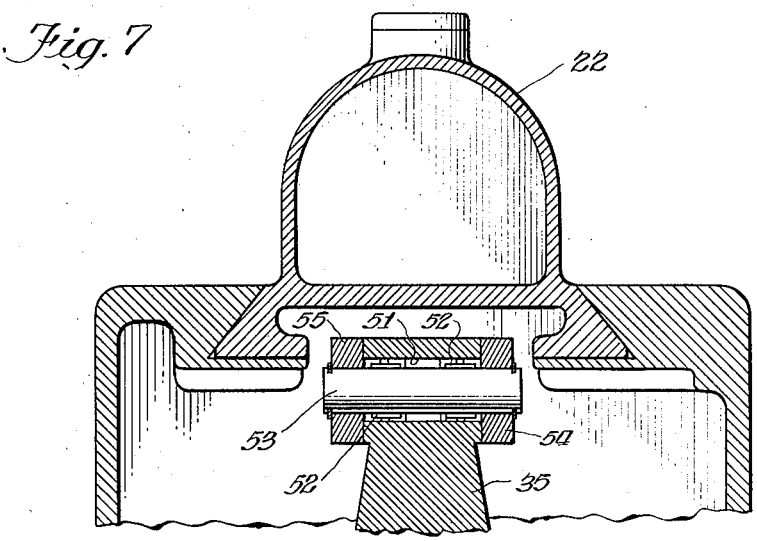
Figure 8:
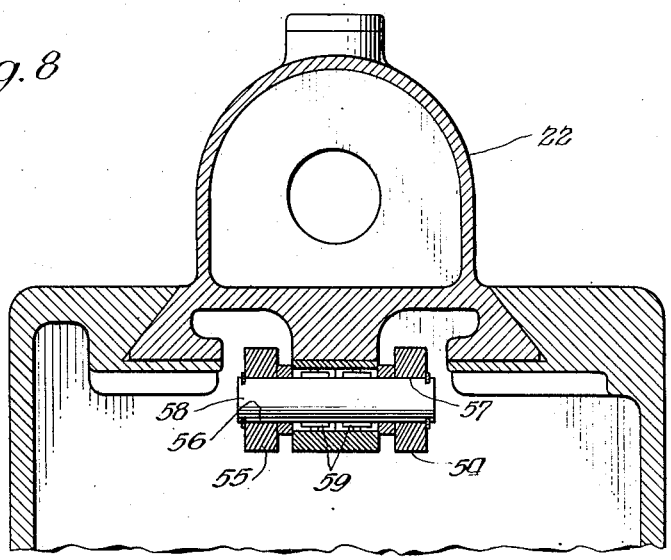
Figure 9:
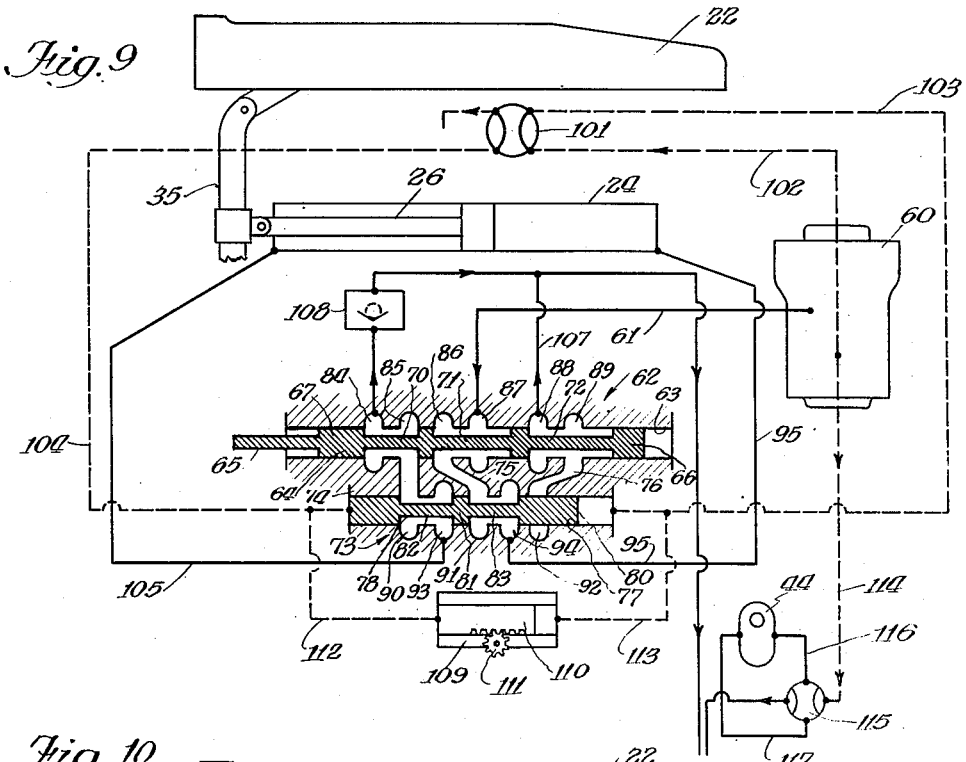
Figure 10:
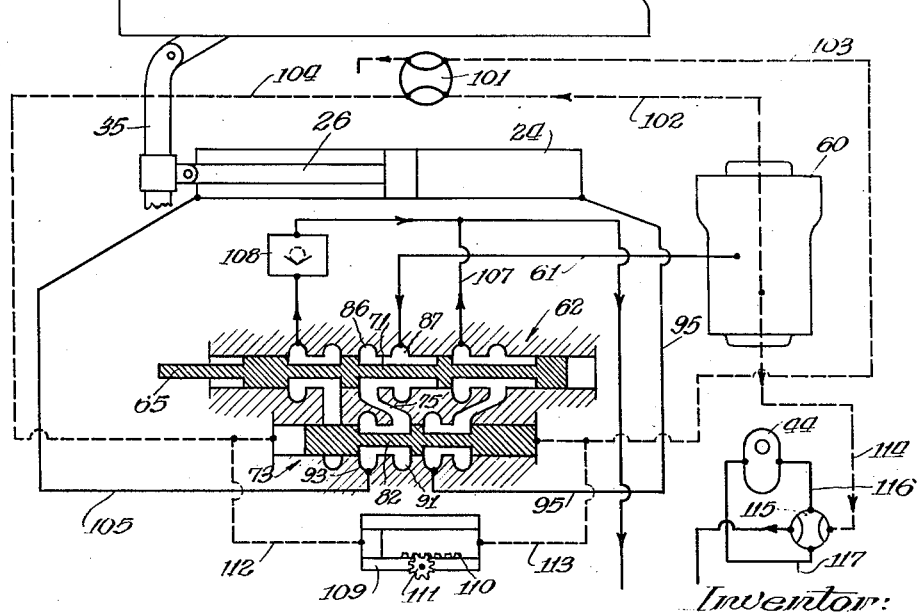
Figures 11, 12:
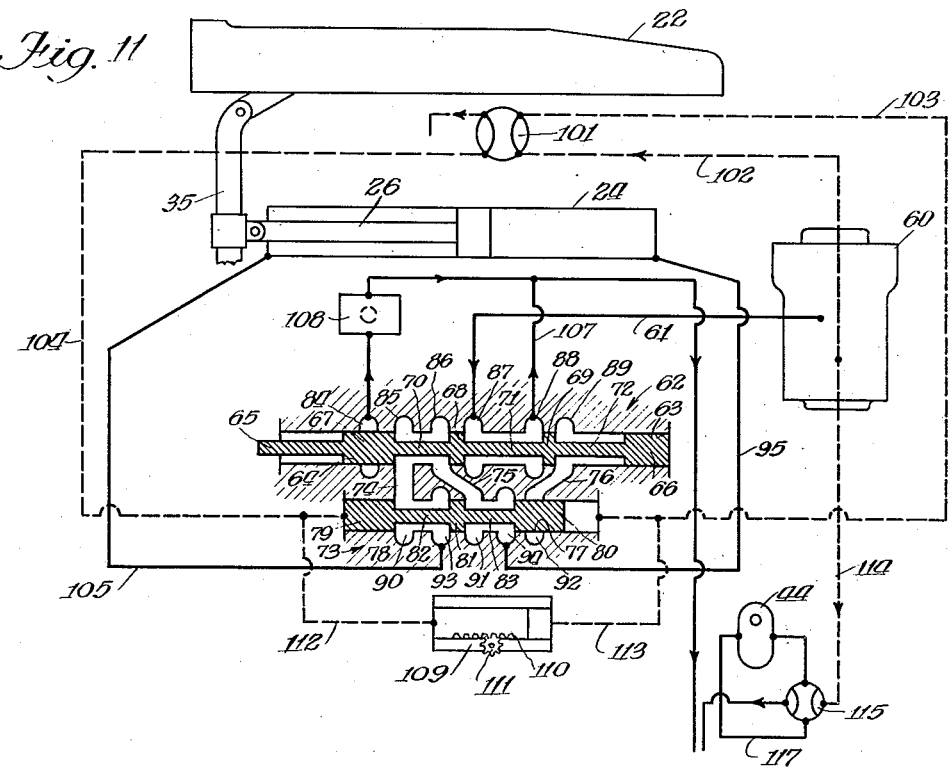

Figs. 7 and 8 are sectional views along lines 7—7 and 8—8 of Fig. 2, respectively;

Figs. 9, 10, 11, 13 and 14 are diagrammatic views of the hydraulic circuit and the various positions of its operation; and, Fig. 12 is a view showing the reversing dogs and manual stop valve on the plane.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Two general types of shapers or planers are in common use, and may be described simply as hydraulic shapers and mechanical shapers. In the mechanical shaper, the reciprocating member or ram is reciprocated by means of a crank. The force applied to the ram varies with the position of the crank, reaching its minimum at the 90° point of rotation of the crank, and reaching maximum as the 180° point is attained. Likewise, the speed of the ram varies from zero at the 0° point of rotation of the crank, and attains its maximum at the 90° point and then drops off to zero again at the 180° point. While such a mechanical shaper has the advantage of employing the full horsepower of the power input unit at all times, the variations in power applied to the ram, and the variations of speed, detract from the efficient operation of the shaper.

Many of these disadvantages are overcome by the use of hydraulic shapers in which the power is applied to the ram by the reciprocation of a piston and cylinder device, which device, in turn, receives its power from a pump circulating hydraulic fluid under pressure through a hydraulic circuit. In the hydraulic shaper, ram speeds are constant and the power applied to the ram is likewise constant through the extent of its stroke. Ordinary hydraulic shapers have the disadvantage of a constant torque or cutting force at the tool point in all speeds, giving rise to a waste of power at any speed below maximum.

I have invented and am herein disclosing and claiming a hydraulic shaper that embodies many of the advantages of both the mechanical and the hydraulic type, and has other advantages not found in either of those types. Broadly speaking, the invention embodies a hydraulic piston and cylinder device for reciprocation of the ram. Unlike hydraulic shapers, the piston and cylinder device is not connected directly to the ram but rather is connected to a rocker arm or torque arm. The arm is pivoted to the machine and connected to the ram, and the piston and cylinder device is connectable to the torque arm at a number of positions longitudinal of the arm to vary the ratio between the speed of movement of the ram and the speed of the piston.

The speed of the ram is substantially constant throughout its stroke at any point of connection of the device to the arm. The power output of the piston and cylinder device is constant but the force applied to the ram varies inversely as the speed thereof. Disregarding frictional losses, the power at the tool (that is, cutting force times speed) is equal to the power output of the piston and cylinder device.

Referring now to Fig. 1, 20 indicates a hydraulic shaper having a bed 21 and a ram 22 reciprocably mounted thereon. As best seen in Fig. 2, reciprocation of the ram 22 is achieved through hydraulic power applied to a piston and cylinder device 23. This latter device comprises a cylinder 24 having a piston 25 reciprocable therein, to which piston is connected a connecting rod 26 which extends through packing in the left hand end of the cylinder (as shown in Fig. 2.). Hydraulic fluid under pressure is applied alternately to the piston end and the rod end of the piston to reciprocate the same within the cylinder, such hydraulic circuit being hereinafter more fully described.

The piston and cylinder device 23 is rockably mounted on the bed 21 to permit the same to rock with the reciprocation of the ram. As best shown in Fig. 3, the cylinder 24 is secured within a split housing 27 and held therein by bolts 28. The housing is formed with axial journaled projections 29 on either side, which projections are adapted to be carried on roller bearings 30 which in turn are free to roll within the raceway 31. Housings 32 surround the bearing raceway 31, which housings are firmly secured to the bed of the machine. The arrangement just described, permits the piston and cylinder device to rock about the axis of the journals 29 with the reciprocation of the ram.

The piston rod 26 is provided with a threaded portion 33 adjacent its left hand end, to which is threaded a bracket 34. This bracket serves to secure the piston and cylinder device to a mounting 45 which is adjustably attached to a torque arm 35.

As can be seen in Fig. 2, the torque arm is mounted in a substantially vertical position. The upper end of the torque arm is connected to the ram by a link 50 and the lower end is pivotally mounted on the bed. The arm, in the preferred embodiment shown, is provided with a generally cylindrical portion 35a intermediate its ends. The torque arm 35 is adapted to be oscillated about its point of pivot to the bed by reciprocating the piston 25 and being connected to the ram by the link 50 thereby to cause reciprocation of the ram 22.

As best seen in Fig. 4, the lower portion of the arm is secured to two housings 36 which housings are rotatably mounted on portions 37 and 38 of the bed by means of roller bearings 39 interposed therebetween. A threaded shaft 40 is rotatably mounted on the arm and adapted to be rotated by either manual or hydraulic power. The lower portion of the threaded shaft is provided with a gear 41 adapted to engage the threads of a worm 42. As shown in Fig. 5 rotation of the shaft may be achieved by manual rotation of a shaft 43 secured to the worm. If a fully hydraulic control is desired, the arrangement shown in Fig. 4 may be employed, in which the worm 42 is mounted upon a rotatably mounted shaft 43a which in turn is adapted to be rotated by a hydraulic motor 44.

As best seen in Figs. 2, 6 and 15, the mounting 45 consists of a U-shaped member 121 provided with holes 122 and 123 in which anti-friction bearings 124 are retained to carry a rotatable shaft 126. A split bearing ring 46 has a first portion 127 surrounding half of the cylindrical portion 35a and extending into the arms of the U-shaped member 121. A hole 128 in the portion 125 is adapted to receive the shaft 126 and thereby provide a pivotal connection between the member 121 and the bearing ring 46. The second portion 129 of the bearing ring surrounds the remainder of the shaft 35a and is secured to the first portion by bolts 130 and 131.

Attached by bolts 132 to the upper and lower faces of the portion 129 are two nut members 133 and 134 provided with threads meshing with the threads on the shaft 40. Shims may be inserted between the nut members and the faces to take up any play between the members and the threaded shaft. Rotation of the shaft 40 causes the mounting 45 to travel longitudinally thereof, with the nuts 133 and 134 moving in a space 135 provided in the arm 35, thereby to shift the point of connection of the piston rod 26 to the shaft.

A flexible cable 48 has one end secured to the lower end of the threaded shaft and the other end is secured to an indicating device 49 visible on the exterior of the machine to indicate visually the particular location of the point of connection of the connecting rod to the torque arm.

The upper portion of the torque arm is pivotally secured to the ram by means of a link 50. As best shown in Fig. 7, the upper portion of the arm is provided with a hole 51 wherein the roller bearings 52 are mounted, which bearings in turn carry the shaft 53. The link, comprising the two parallel arms 54 and 55, is secured to the shaft 53. The other ends of the link are likewise provided with holes 56 and 57 which engage a shaft 58 rotatably mounted on bearings 59 upon the ram member 22.

The points of pivot of the arm 35 to the link at 53 and to the base at 42 and of the mounting 45 to the bracket 34 at 126, all lie in substantially the same plane.

The preferred hydraulic circuit for reciprocation of the piston and cylinder device is diagrammatically illustrated in Figs. 9, 10, 11, 13 and 14. The hydraulic circuit employs a constant displacement pump 60 which is connected by means of conduit 61 to a selector valve 62. This valve comprises a bore 63 having a valve 64 slidably mounted therein. A portion 65 of the valve stem protrudes from the bore in order that it may manually be moved to the various positions hereinafter described. The valve has two end portions 66 and 67 and two intermediate lands 68 and 69, and is provided with a reduced portion 70 between the left hand end and the first land, a second reduced portion 71 between the two lands and a third reduced portion 72 between the second land and the right hand end of the valve. The selector valve is connected to a four-way valve 73 by passages 74, 75 and 76.

The four-way valve comprises a bore 77 having a valve 78 slidably mounted therein. The valve has two end portions 79 and 80 and a single land 81. Two reduced portions 82 and 83 are provided between each end and the land. The selector valve 62 is provided with annular grooves 84, 85, 86, 87, 88 and 89, the annular grooves 85, 86 and 89 connecting with the passages 74, 75 and 76, respectively. The said passages are connected with annular grooves 90, 91 and 92 on the four way valve which is further provided with the annular grooves 93 and 94.

With the valve in the position shown in Fig. 9, hydraulic fluid under pressure is conducted from the pump 60 to the annular groove 87 by the conduit 61 and thence via the reduced portion 71 and passage 75 to the annular groove 91 on the four-way valve. The fluid thence flows along the reduced portion 83 to the annular groove 94 to a conduit 95 which conducts the fluid to the right hand end of the cylinder 24 to move the piston therein to the left and thereby oscillating the torque arm 35.

The ram 22 is provided with reversing dogs 96 and 97 (as shown in Fig. 1) which may be slid in a guideway 98 and clamped in various positions on the ram by clamping handles 99. As shown in Fig. 12, the reversing dogs are adapted to trip a cam 100 which in turn actuates a pilot valve 101 to reverse the flow of hydraulic fluid.

As seen in Fig. 9, the fluid from the pump 60 is directed through the pilot valve by a conduit 102 and with that valve in the position shown in that figure, the fluid is thence directed by means of a conduit 103 to the right hand end of the four-way valve 73 to move it to the position shown.

When the reversing dog 97 strikes the cam 100, the pilot valve is moved to the position shown in Fig. 10 in which fluid from the conduit 102 is directed to a conduit 104 and discharged into the left hand end of the four-way valve 73 to move it to the position shown. With the valve in this position, fluid under pressure from the pump is directed to the left hand end of the cylinder by means of annular groove 87, reduced portion 71, passage 75, annular groove 91, reduced portion 82, annular groove 93 and a conduit 105. The point of reversal is determined by the position of the reversing dogs, but the ram may be reversed manually any time by means of a handle 106 readily accessible on the exterior of the machine, which handle is adapted to trip the cam 100 regardless of the position of the ram.

Figure 13:
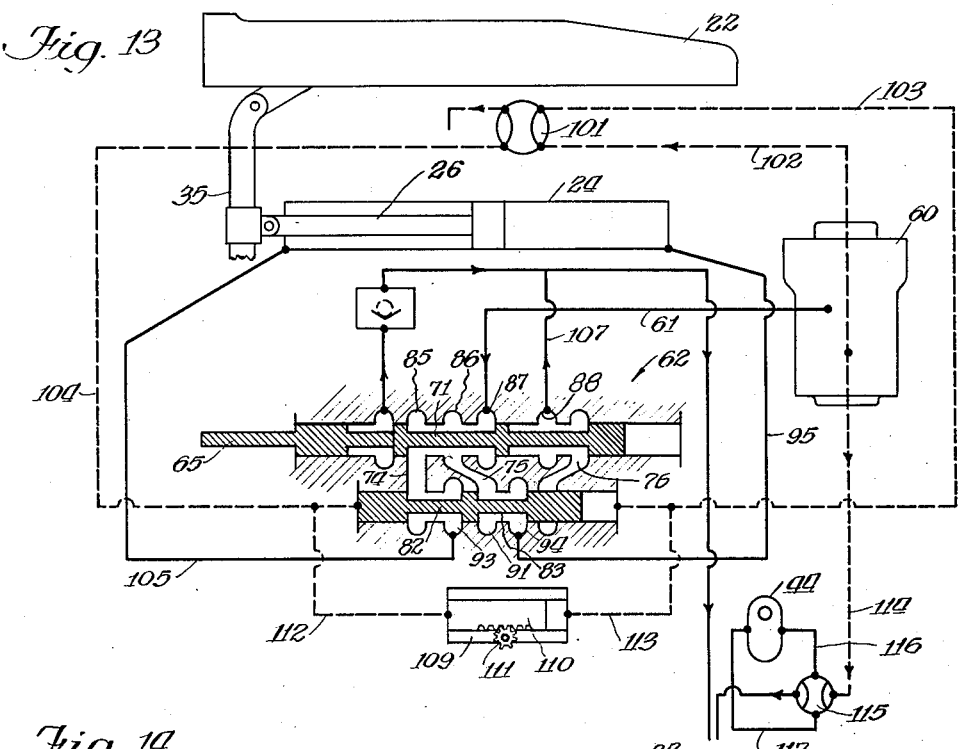
Figure 14:
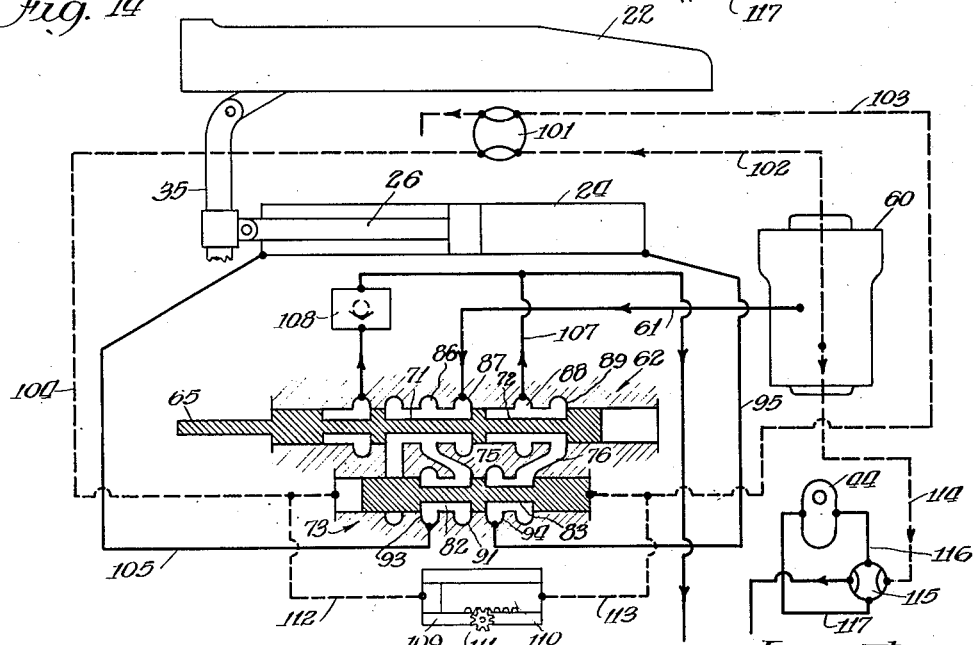

Movement of the selector valve to the position shown in Fig. 13 directs fluid under pressure from the pump 60 to both ends of the cylinder 24 by means of the reduced portion 71, passages 75 and 74, and annular grooves 93 and 94. With fluid under pressure applied to both ends of the cylinder, a rapid stroke is achieved. Reversal of the stroke is achieved in a manner similar to the reversal just described. Upon the return stroke, as illustrated in Fig. 14, the fluid in the right hand end of the cylinder is returned to a sump by means of the conduit 95, annular groove 94, passage 76, annular groove 88 and conduit 107. A back pressure valve 108 is interposed in the hydraulic circuit to maintain a predetermined amount of back pressure on the fluid to insure smooth operation of the ram.

The table carrying the work piece is designed to be moved intermittently with the reciprocation of the ram. This intermittent movement is achieved by means of the feed cylinder 109 having a piston 110 reciprocable therein. The piston device is provided with means for intermittently rotating a shaft 111 for movement of the table. The piston 110 is adapted to be moved from one end to the other end of the cylinder 109 at the same time that the four-way valve is shifted. This is accomplished by connecting each end of the cylinder 109 to the conduits 104 and 103 by means of the conduits 112 and 113. It can be seen then, that upon the movement of the pilot valve 101, hydraulic fluid under pressure is directed to both the four-way valve and the feed cylinder to reciprocate them in their respective bore and cylinder.

As was previously described, rotation of the threaded shaft 40 may be achieved either manually or by means of the hydraulic motor 44. This hydraulic motor is connected in the hydraulic circuit, as shown in Figs. 9, 10, 11, 13 and 14. Hydraulic fluid under pressure may be supplied to the motor from a conduit 114 from the pump 60 by a pilot valve 115 and conduits 116 and 117. Movement of the pilot valve to supply fluid to the hydraulic motor is achieved manually when desired.

It can be seen from the foregoing that a constant power is applied to the piston and cylinder device 23 in either position of the selector valve. The force applied to the ram, however, may be varied by changing the point of connection of the piston and cylinder device to the torque arm. With the piston connected to the lower portion of the torque arm, that is, a point close to the point of pivot of the arm, the force delivered at the cutting tool is less than the force delivered at the tool when the piston is connected to the upper portion of the torque arm. The full horsepower delivered to the piston and cylinder device is utilized at all times, even with widely varying ram speeds and force. In this manner, an inexpensive constant displacement pump may be used in the hydraulic circuit and the efficiency and versatility of the machine are greatly enhanced.

I claim:

1. In a machine tool having a bed and a ram reciprocably mounted on the bed, means for reciprocating the ram including a torque arm pivotally mounted on the bed and connected to the ram, said torque arm being adapted to be oscillated about its pivot to reciprocate the ram, reciprocating means for oscillating the arm, and means connecting the reciprocating means to the arm, said connecting means being connectable to said arm at a plurality of fixed positions longitudinal of the arm, whereby to vary the ratio between the distance of the reciprocation of the ram and the distance of reciprocation of said means.

2. In a machine tool having a bed and a ram reciprocably mounted on the bed, means for reciprocating the ram including a torquet arm pivotally mounted on the bed and connected to the ram, said torque arm being adapted to be oscillated about its pivot to reciprocate the ram, a rotatably mounted threaded shaft attached to the arm and extending longitudinally thereof, a mounting about the shaft engaging the threads thereof and adapted to be moved longitudinally of the arm with rotation of the shaft and reciprocating means connected to the mounting for oscillating the arm.

3. In a machine tool having a bed and a ram reciprocably mounted on the bed, means for reciprocating the ram including a torque arm having one end pivotally mounted on the bed and having the other end pivotally connected to the ram, a cylinder rockably mounted on the bed and having a piston reciprocable therein, and means connecting the piston to the arm, said means being connectable to the arm at a plurality of fixed positions longitudinal of the arm, reciprocation of the piston being adapted to cause the torque arm to oscillate about its pivot and thereby to reciprocate the ram.

4. In a machine tool having a bed and a ram reciprocably mounted on the bed, means for reciprocating the ram including, a torque arm pivotally mounted on the bed and connected to the ram, said torque arm being adapted to be oscillated about its pivot to reciprocate the ram, a rotatably mounted threaded shaft attached to the arm longitudinal thereof, a mounting about the shaft adapted to engage the threads thereof and adapted to be moved longitudinally of the arm with rotation of the shaft, and a cylinder rockably mounted on the bed and having a piston reciprocable therein, said piston being connected to the mounting to oscillate the said arm, the ratio between the distance of reciprocation of the ram to the distance of reciprocation of said piston being variable by the rotation of said shaft.

5. The machine tool of claim 4 including indicating means associated with said threaded shaft.

6. In a machine tool having a bed and a ram reciprocably mounted on the bed, means for reciprocating the ram including a torque arm pivotally mounted on the bed and connected to the ram, said torque arm being adapted to be oscillated about its pivot to reciprocate the ram, a hydraulic piston and cylinder device rockably mounted on said bed, means connecting the device to the arm whereby reciprocation of the piston is adapted to cause oscillation of the arm, and a hydraulic circuit including a pump and valve means interposed in said circuit to direct hydraulic fluid from said pump to alternate ends of said cylinder to reciprocate the piston therein.

7. In a hydraulic machine tool having a bed and a ram mounted for horizontal reciprocation on the bed, means for reciprocating the ram including a substantially vertical torque arm having its upper end pivotally connected to the ram and having its lower end pivoted to the bed, oscillation of the arm about its pivot to the bed being adapted to cause reciprocation of the ram, a mounting connectable to the arm at a plurality of fixed positions longitudinal thereof, and reciprocating motor means pivotally connected to the mounting for oscillating the arm.

8. In a hydraulic machine tool having a bed and a ram mounted for horizontal reciprocation on the bed, means for reciprocating the ram including a substantially vertical torque arm having its upper end pivotally connected to the ram and having its lower end pivoted to the bed, oscillation of the arm about its pivot to the bed being adapted to cause reciprocation of the ram, a mounting connectable to the arm at a plurality of fixed positions longitudinal thereof, and a hydraulic piston and cylinder device rockably mounted on the bed and connected to the mounting for oscillating the arm.

9. In a hydraulic machine tool having a bed and a ram mounted for horizontal reciprocation on the bed, means for reciprocating the ram including a substantially vertical torque arm having its upper end pivoted to a link pivotally mounted on the ram and having its lower end pivoted to the bed, oscillation of the arm about its pivot to the bed being adapted to cause reciprocation of the ram, a rotatably mounted threaded shaft attached to the arm longitudinally thereof, a mounting about the arm having a first portion engaging the threads of the shaft and a second portion slidably contacting the arm, said mounting being adapted to be moved longitudinally of the arm with rotation of the shaft, and motor means connected to the mounting for oscillating the arm.

10. In a hydraulic machine tool having a bed and a ram mounted for horizontal reciprocation on the bed, means for reciprocating the ram including a substantially vertical torque arm having its upper end pivotally connected to the ram and having its lower end pivoted to the bed, oscillation of the arm about its pivot to the bed being adapted to cause reciprocation of the ram, a mounting connectable to the arm at a plurality of fixed positions longitudinal thereof, and a substantially horizontally disposed hydraulic piston and cylinder device rockably mounted on the bed and pivotally connected to the mounting to oscillate the arm.

11. In a hydraulic machine tool having a bed and a ram mounted for horizontal reciprocation on the bed, means for reciprocating the member including a substantially vertical torque arm having its upper end pivotally connected to the ram and having its lower end pivoted to the bed, said arm having a generally cylindrical intermediate portion and oscillation of the arm about its pivot to the bed being adapted to cause reciprocation of the ram, a rotatably mounted threaded shaft attached to the arm longitudinally thereof, a mounting about the arm having a first portion engaging the threads of the shaft and a second portion slidably contacting the cylindrical portion of the arm, said mounting being adapted to be moved longitudinally of the arm with rotation of the shaft, and a substantially horizontally disposed hydraulic piston and cylinder device rockably mounted on the bed and pivotally connected to the mounting to oscillate the arm.

12. Apparatus of the character described in claim 11 in which the points of pivotal connection of the arm to the bed and to the ram, and the point of pivotal connection of the piston and cylinder device to the mounting, lie in substantially the same plane.

13. In a hydraulic machine tool having a bed and a ram mounted for horizontal reciprocation on the bed, means for reciprocating the member including a substantially vertical torque arm having its upper end pivotally connected to a link pivoted to the ram and having its lower end pivoted to the bed, said arm having a generally cylindrical intermediate portion and oscillation of the arm about its pivot to the bed being adapted to cause reciprocation of the ram, a rotatably mounted threaded shaft attached to the arm longitudinally thereof, a hydraulic motor adapted to rotate the shaft, a mounting about the arm having a first portion engaging the threads of the shaft and a second portion slidably contacting the cylindrical portion of the arm, said mounting being adapted to be moved longitudinally of the arm with rotation of the shaft, an indicating device operatively associated with the shaft to indicate visually the position of the mounting on the arm, and a substantially horizontally disposed hydraulic piston and cylinder device rockably mounted on the bed and pivotally connected to the mounting to oscillate the arm.

RUDOLPH E. HERRSTRUM.

REFERENCES CITED

The following references are of record in the file of this patent:

UNITED STATES PATENTS

| Number | Name | Date |
|---|---|---|
| 823,273 | Hanna | June 12, 1906 |
| 1,696,850 | Killingsworth | Dec. 25, 1928 |
| 1,958,106 | Llewellyn et al. | May 8, 1934 |
| 2,295,130 | Schreiber et al. | Sept. 8, 1942 |